US006278196B1

(12) United States Patent
Ehrhart et al.

(10) Patent No.: US 6,278,196 B1
(45) Date of Patent: Aug. 21, 2001

(54) MOTOR VEHICLE WITH ELECTRICAL GENERATOR

(75) Inventors: Peter Ehrhart, Munich; Manfred Heeg, Starnberg, both of (DE)

(73) Assignee: Magnet-Motor Gesellschaft fuer Magnet-Motorische Technik mbH, Starnberg (DE)

(*) Notice: Subject to any disclaimer, the term of this patent is extended or adjusted under 35 U.S.C. 154(b) by 0 days.

(21) Appl. No.: 09/077,711
(22) PCT Filed: Dec. 6, 1996
(86) PCT No.: PCT/EP96/05478
  § 371 Date: Dec. 14, 1998
  § 102(e) Date: Dec. 14, 1998
(87) PCT Pub. No.: WO97/21560
  PCT Pub. Date: Jun. 19, 1997

(30) Foreign Application Priority Data

Dec. 8, 1995 (DE) .............................. 195 45 922

(51) Int. Cl.⁷ .......................... F02N 11/06; B60L 11/14
(52) U.S. Cl. ............................ 290/40 C; 180/65.4
(58) Field of Search ............... 290/40 R, 40 B, 290/40 C; 322/4, 14, 15, 16; 180/65.4; 475/5

(56) References Cited

U.S. PATENT DOCUMENTS

| 3,077,541 | * | 2/1963 | Valus ................................. 290/1 |
| 4,093,906 | * | 6/1978 | Draxler ............................... 322/51 |
| 4,326,158 | * | 4/1982 | Helgesen ............................. 322/4 |
| 4,617,626 | * | 10/1986 | Morishita et al. .................. 364/424 |
| 4,862,009 | * | 8/1989 | King ................................. 290/22 |
| 4,877,273 | 10/1989 | Wazaki et al. ..................... 290/40 C |
| 4,908,540 | * | 3/1990 | Motodate et al. ................... 310/240 |
| 4,959,595 | * | 9/1990 | Nishimura .......................... 318/138 |
| 5,390,068 | * | 2/1995 | Schultz et al. ..................... 361/95 |
| 5,433,282 | * | 7/1995 | Moroto et al. ..................... 180/65.2 |

(List continued on next page.)

FOREIGN PATENT DOCUMENTS

| 2925675 A1 | 2/1981 | (DE) . |
| 3009279A1 | 10/1981 | (DE) . |
| 3050269A1 | 10/1982 | (DE) . |
| 3743317 A1 | 6/1989 | (DE) . |
| 4102076 A1 | 8/1991 | (DE) . |
| 4323601 A1 | 1/1995 | (DE) . |
| 0379 357 A2 | 7/1990 | (EP) . |
| 0379357 A3 | 7/1990 | (EP) . |
| 7046773 | 2/1995 | (JP) . |
| WO 9108919 A1 | 6/1991 | (WO) . |

OTHER PUBLICATIONS

Georg Siemens, "Elektro–und Klimatechnische Einrichtungen der neuen Eurocity Wagen Schweizerischen Bundesbahnen (SSB)," ZEV+DET Glas. Ann. 115(1991), Nr.4, Apr. . p. 105–108.

Primary Examiner—Nicholas Ponomarenko
(74) Attorney, Agent, or Firm—Venable; George G. Spencer; Robert Kinberg

(57) ABSTRACT

A motor vehicle with a combustion engine (2), a transmission (8) and a mechanical drive line (6) comprises a coaxially disposed electric generator (10) for providing power to electric loads, said generator being coupled directly with the crankshaft (4) of the combustion engine. The rotor of the generator serves as a flywheel in particular when the generator is designed in outside rotor construction. Stator and rotor of the generator are each formed as hollow cylinders and have a small axial length in comparison to the mounting diameter of the generator. The generator can also be used as a starter motor when operated as a motor. An additional possibility of application is for damping the torsional vibration of the crankshaft of the combustion engine, the transmission and the mechanical drive line.

36 Claims, 3 Drawing Sheets

U.S. PATENT DOCUMENTS

| | | | | |
|---|---|---|---|---|
| 5,489,001 | * | 2/1996 | Yang | 180/65.2 |
| 5,513,719 | * | 5/1996 | Moroto et al. | 180/65.4 |
| 5,549,524 | * | 8/1996 | Yang | 477/3 |
| 5,603,671 | * | 2/1997 | Schmidt | 475/5 |
| 5,643,119 | * | 7/1997 | Yamaguchi et al. | 475/5 |
| 5,691,588 | * | 11/1997 | Lutz et al. | 310/92 |
| 5,735,770 | * | 4/1998 | Omote et al. | 477/5 |
| 5,755,302 | * | 5/1998 | Lutz et al. | 180/65.2 |
| 5,799,744 | * | 9/1998 | Yamaguchi et al. | 180/65.2 |
| 5,903,061 | * | 5/1999 | Tsuzuki et al. | 290/40 C |
| 6,018,198 | * | 1/2000 | Tsuzuki et al. | 290/17 |

* cited by examiner

MOTOR VEHICLE WITH ELECTRICAL GENERATOR

BACKGROUND OF THE INVENTION

The invention relates to a motor vehicle comprising a combustion engine, a mechanical drive line coupled with the shaft of the combustion engine, and an electric generator driven by the combustion engine.

The present invention concerns specifically the formation and arrangement of the electric generator. In conventional motor vehicles, the generator is driven by the output shaft of the combustion engine via a V-belt. The electric power demand has increased greatly in recent years not only for road vehicles, but also for motor trucks, buses and the like, so that the electric generator (alternator) has been made increasingly efficient. If necessary, a plurality of electric generators has been provided.

The usual board wiring voltages (12 V/24 V), in case of high-power electric loads, necessitate correspondingly high currents. The cross-sectional areas of lines must be selected correspondingly large.

SUMMARY OF THE INVENTION

It is the object of the invention to make available a motor vehicle of the type indicated hereinbefore, in which relatively high electric power can be supplied by the electric generator despite a compact construction.

This object is met according to the invention in that the generator is disposed with is rotor coaxial to the shaft of the combustion engine between the latter and the input of the drive line, and is driven directly by the shaft, and in that the electric output of the generator is connected to a power electronics unit.

It is preferred to equip the rotor with (high-energy) permanent magnets. Rotor and stator of the generator are advantageously disposed spatially between the combustion engine and the drive line and form a modular unit which can be mounted quickly and without a problem.

Due to the fact that there is no intermediate mechanical connection between combustion engine and generator, i.e. in particular as the belt drive in conventional vehicles is omitted, a compact construction is obtained. The drive line is coupled directly to the electric generator and contains on the input side e.g. an automatic transmission with a torque converter or a shift transmission with a clutch.

With conventional engines there is enough space available in the area of the output shaft of the engine to accommodate the electric generator that is preferably formed as a thin disk. Due, to the permanent-magnetic excitation, one can make good use of the structural space available for the generator, thereby achieving high torque and thus high electric power in relation to the volume and weight of the generator. The electric power of the generator is preferably in the range between 5 and 10 kW. The generator can thus easily provide the power to be delivered in conventional vehicles. However, a generator with the described arrangement and construction can also easily realize far higher powers (>50 kW) which are needed for example in heavy vehicles when secondary or additional loads normally driven mechanically are advantageously changed to electric drive (e.g. steering booster pumps, air-conditioning or cooling units and the like).

For being able to design the generator in compact manner as a module, the diameter is selected relatively large while the axial length is relatively small.

It is possible to give the generator a so-called inside rotor construction, in which the rotor rotating with the crankshaft of the combustion engine is on the inside while the stator is disposed radially outside the rotor.

However, the so-called outside rotor construction has certain advantages. When the rotor is outside and the stator inside with this outside rotor construction, one can utilize the then especially high mass moment of inertia of the rotor, so that no additional flywheel is required in addition to the rotor. This holds equally for the inside rotor design with a correspondingly high mass moment of inertia of the rotor.

The design of the generator with a rotor and a stator each formed as a thin-walled cylinder leaves enough space in the area of the axis of the engine shaft to permit parts of the transmission or clutch to be received therein. This permits the overall constructional length of combustion engine/generator/transmission to be kept very short. A particularly favorable ratio of mounting diameter to mounting length of the generator has turned out to be a value of 2 or more. That is to say, the diameter of the generator is at least twice as large as the axial length thereof.

The rotor can take over a further function of the fly-wheel by being equipped with external teeth meshing with the pinion of the starter motor. This possibility can be realized especially easily with the outside rotor construction, but is also possible with an inside rotor if the stator is mounted suitably.

The torque to be applied for starting the combustion engine need not be applied solely by the electric starter motor; the generator itself can operate as a motor to support the separate starter motor or even replace it completely for starting the combustion engine. The generator is then fed by the on-board battery via the afore-mentioned power electronics unit, so that the torque supplied by the generator operating as a motor supports the starter motor. With an especially strong generator, the torque thereof might possibly suffice alone for starting the combustion engine, so that a separate starter can be dispensed with. A special measure of the invention provides for the use of a separate electronic assembly for the motor mode of operation. This permits both the generator and the motor mode of operation to be represented with assemblies designed for each particular case.

The modular generator is expediently provided with input-side and output-side standard flanges so that it can be coupled with the engine block and gearbox, respectively, without requiring any special adaptation measures. The generator can be manufactured in different overall sizes/power outputs and is provided with standard flanges.

The power electronics unit serves as a commutating means which first converts the alternating voltage delivered by the generator into a direct voltage and forms a direct-voltage intermediate circuit. The voltage in the direct-voltage intermediate circuit is preferably between 100 and 1000 volts. With this direct voltage, separate electronic assemblies can produce different direct voltages and alternating voltages with the suitable frequency and amplitudes for special loads. However, the direct voltage of the intermediate circuit can also be used directly for providing power to corresponding loads.

Another possibility consists in giving the power electronics unit e.g. a direct converter design so that it supplies the voltages and frequencies required by the various loads directly at its output terminals.

Due to the relatively high voltage in the direct-voltage intermediate circuit, it is possible to feed certain loads with relatively high voltage, for example heating elements which require a relatively high amount of power. The relatively high voltage permits the use of lines with comparatively small line cross-sectional area. In addition, it is favorable for the dimensioning of semiconductor switches.

It is expedient to provide the power electronics unit with an automatic control system for controlling and regulating the loads connected on the output side with respect to the electrical power drawn by them. This is preferably done according to preset values to be achieved by the loads (for example the temperature of the cooling unit). This system can be part of the power electronics unit itself or be provided as separate control acting on individual loads or load groups.

An independently protected measure of the invention consists in that the automatic control system of the power electronics unit serves to control the operation of the combustion engine.

When a certain power is taken up from the engine by the drive line for driving the vehicle, the power electronics unit can control the engine in such a way that the mechanical power required for an electrical output power delivered by the generator is made available by the combustion engine without diminishing the power supplied by the combustion engine to the drive line. The above-described control system, however, can also serve very special purposes; for example, the power electronics unit can adjust the output for certain or all loads downward optionally to zero or a minimum, when the entire or almost the entire power of the combustion engine is to go to the drive line. This may be the case e.g. when maximum vehicle acceleration is desired.

It was mentioned hereinbefore that the generator can be used as a motor, so that the motor can be used for example for starting the combustion engine. In general it is of course also possible to use the motor for driving the drive line if suitable electric power and energy are present. For this purpose the power electronics unit then contains, in a manner known per se, four-quadrant inverse rectifiers in the form of separate assemblies. When the generator operates as a motor, the electric current is then fed via these assemblies.

Another generator application claimed by the invention is for damping or eliminating disturbances in the uniform speed pattern of the crankshaft of the combustion engine and the drive line, which lead to undesirable noise being caused in the vehicle. In the simplest case, these may also be torsional vibrations of the parts mentioned.

The afore-mentioned damping effect is achieved in that, upon changes in the actual rotor speed with respect to the average rotor speed, torques and thus forces counteracting these changes in direction and amplitude are applied to the rotor via the stator. This is done by correspondingly increasing or decreasing the current in the stator coils which is controlled by the associated power electronics unit.

In other words, if there is e.g. a brief positive acceleration of the rotor, a braking force is applied by the stator by means of corresponding current variation in the power electronics unit. In the normal generator mode of operation of the generator, this means a brief increase in coil current as compared to the normal operating value, so that more power, i.e. torque is taken off and the excessive speed is decelerated.

However, if the rotor is decelerated in relation to the uniform speed e.g. by a torsional vibration, the torque taken off from the generator is reduced by the stator through current reduction—again considering the generator mode of operation of the generator—, resulting in a positively accelerating force being exerted on the rotor.

Both modes of operation, i.e. active torque increase and decrease on the generator rotor, follow one after the other since every complete torsional vibration means an acceleration and deceleration of the rotor, or vice versa. The actively applied antitorque moment follows the rotational acceleration with a certain phase shift, resulting altogether in only a torsional vibration with a greatly reduced amplitude, i.e. a damped torsional vibration. Conceivable is also an adaptive stabilization by determining the vibration pattern of the torsional vibration as a characteristic feature of the overall arrangement of combustion engine and generator, and performing an opposite adjustment in phase and amplitude, so that the vibrational excitation is reduced to zero. This can be done by a so called fuzzy control.

For detecting the changes in rotor speed, one can use a position indicator system in the generator from the signals of which the speed of the rotor is determined. The stated torsional vibrations then manifest themselves as pulsations in the speed with respect to the averaged speed value which can be filtered out accordingly.

It is preferred to use for the purpose mentioned the power electronics unit connected to the generator and serving for decoupling the electric power. Thus, no additional parts are necessary, in particular because the torsional vibrations, apart from the losses related thereto, mean only energy fluctuations. Depending on the special properties of the combustion engine and its rotating parts, the stated speed pulsations or vibrations, however, can also be of particularly high frequency, i.e. far above the normal operating speed of the rotor. In such cases it is particularly preferred to install an additional, especially fast-working power electronics and control assembly separately from the electronics unit serving to couple out electric power.

BRIEF DESCRIPTION OF THE DRAWINGS

In the following, embodiments of the invention will be elucidated in more detail with reference to the drawings, in which.

DETAILED DESCRIPTION OF THE PREFERRED EMBODIMENTS

Figure 1:
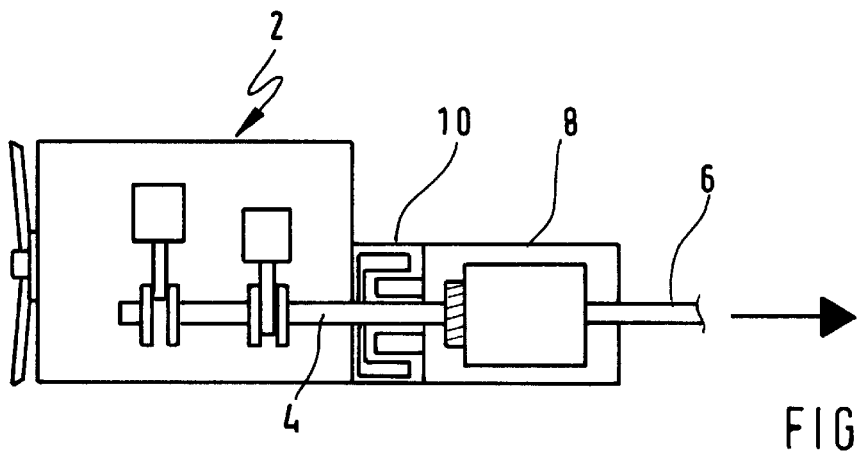
FIG. 1 shows a schematic view of the drive part of a motor vehicle.

FIG. 1 shows schematically a combustion engine 2, with the indicated pistons rotating via connecting rods a crankshaft 4 whose output at the right-hand end of the engine 2 extends through the housing of an electric generator 10. The drive line 6 starting out from crankshaft 4 contains a transmission unit 8 including a torque converter or a clutch.

As shown schematically in FIG. 1, electric generator 10 is located at the level of crankshaft 4 of engine 2 so that the rotor of generator 10 is in concentric arrangement with crankshaft 4 and rotates together with crankshaft 4.

Figure 2:
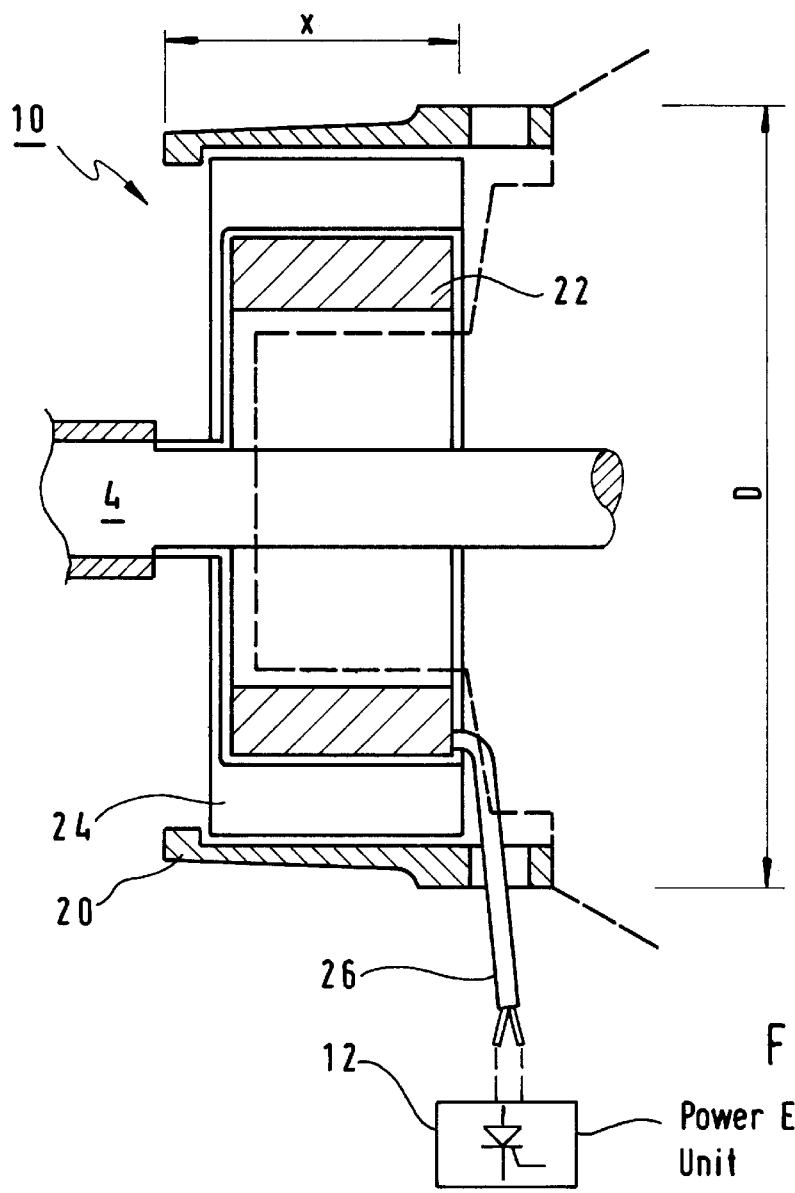
FIG. 2 shows a schematic sectional view of the electric generator shown in simplified form in FIG. 1, along with the associated power electronics unit.

As regards the construction, the housing of generator 10 consists of a thin disk whose axial length is smaller than its diameter; in the example shown the diameter is about twice as large as the axial length of generator 10. FIG. 2 indicates the diameter D and the axial length x. The ratio D/x is $\geq 2$. As can be seen in FIG. 2 furthermore, generator 10 is accommodated in a housing 20 which can be threadedly mounted to the block of combustion engine 2 and to the input side of transmission 8, respectively.

In FIG. 2 the engine is disposed on the left-hand side, and the drive line 6 inclusive of transmission 8 on the right-hand side.

Electric generator 10 contains a stator 22 formed as a thin-walled cylinder connected to housing 20 in a manner not depicted in more detail.

Rotor 24 that is likewise formed as a thin-walled cylinder is coupled with crankshaft 4 of combustion engine 2. A disk-shaped or bell-shaped carrier branches off from crankshaft 4 in radial direction, having mounted on the peripheral area thereof high-energy permanent magnets spaced only a small distance from the outer circumferential surface of stator 22.

Rotor 24 constitutes a mass moment of inertia so that the rotor also functions as a flywheel for combustion engine 2.

Extending from stator 22 are connecting cables 26 to a power electronics unit 12 formed in a manner known per se, i.e. containing a direct-voltage intermediate circuit delivering a direct voltage of U1 100 V in the present case. Following the direct-voltage intermediate circuit is an inverse rectifier assembly, which in the embodiment shown in FIG. 5 is in the form of separate electronic assemblies combined in an assembly unit 13 for converting voltage for individual loads or load groups.

Figure 5:
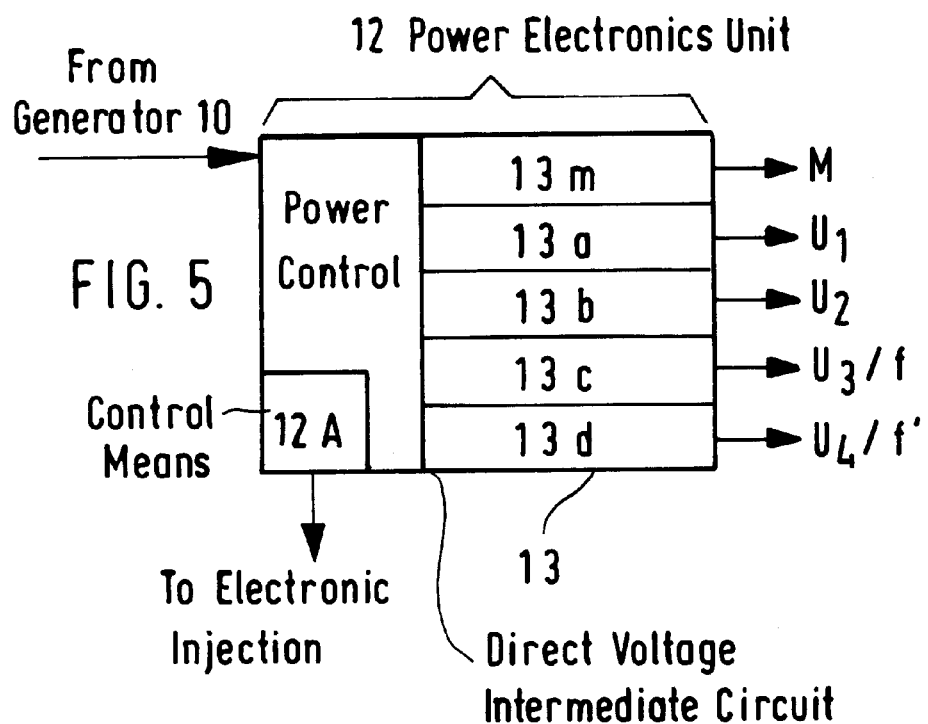
FIG. 5 shows a schematic circuit diagram of the power electronics unit which contains separate electronic assemblies (inverse rectifiers) of the direct-voltage intermediate circuit and control means for the electronic ignition.

According to FIG. 5, a section 13*a* and a section 13*b* supply two different voltages U1 and U2, which may be different direct voltages. A section 13*c* supplies an alternating voltage U3 having a frequency f. An assembly 13*d* supplies an additional alternating voltage U4 having a different frequency f'. An additional inverse rectifier 13*m* supplies the drive current for the generator when the latter is operated as a motor.

The construction of rotor 24 and stator 22 in the form of a thin hollow cylinder each, as outlined in FIG. 2, still leaves considerable space in the area of crankshaft 4, in which a part of the drive line, in the instant case of transmission 8, can be installed. This end portion of transmission 8 facing the engine with crankshaft 4 protrudes into the interior of stator 22. By exploiting this space, one can shorten the total length of combustion engine 2, electric generator 10 and transmission unit 8.

Power electronics unit 12 additionally contains a control means 12A for the combustion engine, i.e. for the electric/electronic injection system of the combustion engine. The control means 12A contained in power electronics unit 12 can be used to control the power of the combustion engine so that it also provides the power for generator 10 in addition to the mechanical power to be supplied via the drive line.

A specific feature of power electronics unit 12 or assembly unit 13, respectively, is that all connected electric loads are switched off or switched to economical operation in certain situations so that the combustion engine is able to give almost its entire power to the drive line, as is necessary e.g. in case of maximum acceleration.

Due to the fact that different direct voltages and alternating voltages with different frequencies are provided individually, individual loads can be supplied with electric power separately. For example, assembly unit 13 can supply via its section 13*a* a relatively high direct voltage of 100 V to powerful loads, for example heating elements. The relatively high voltage permits a reduction of the cross-sectional areas of the lines and also a favorable dimensioning of semiconductor switches associated with the individual electric loads.

Figure 3:
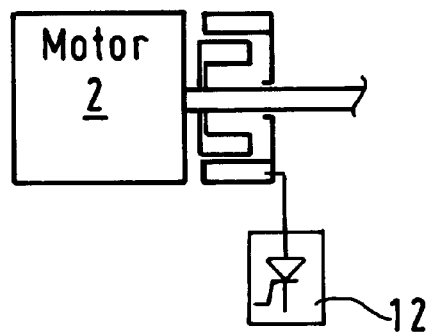
FIG. 3 shows a schematic view of a modified embodiment of an electric generator.

FIG. 3 shows a modified embodiment. In this embodiment, the rotor is formed as an inside rotor while the stator is located radially outside with respect to the inside rotor.

Figure 4:
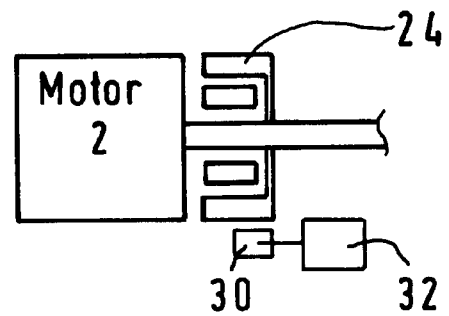
FIG. 4 shows a schematic view of a further modified embodiment of an electric generator.

In case of the variant shown in FIG. 4, the rotor is formed as an outside rotor and has on its outside teeth means, not shown in more detail in the drawing, meshing with a pinion 30 of an electric starter motor 32 for starting combustion engine 2. The generator operating as a motor can then be used in conjunction with starter motor 32 for starting combustion engine 2.

The electric generator provided according to the invention, in a manner known per se, feeds the entire board wiring system, but can furthermore also be used for operating additional devices or external devices, for example for operating pump motors, fan drives and the like. As pointed out hereinbefore, starter motor 32 according to FIG. 4 serves to start the combustion engine in conjunction with the generator which then operates as a motor. However, one can also use solely the separate starter motor for starting the engine.

Figure 6:
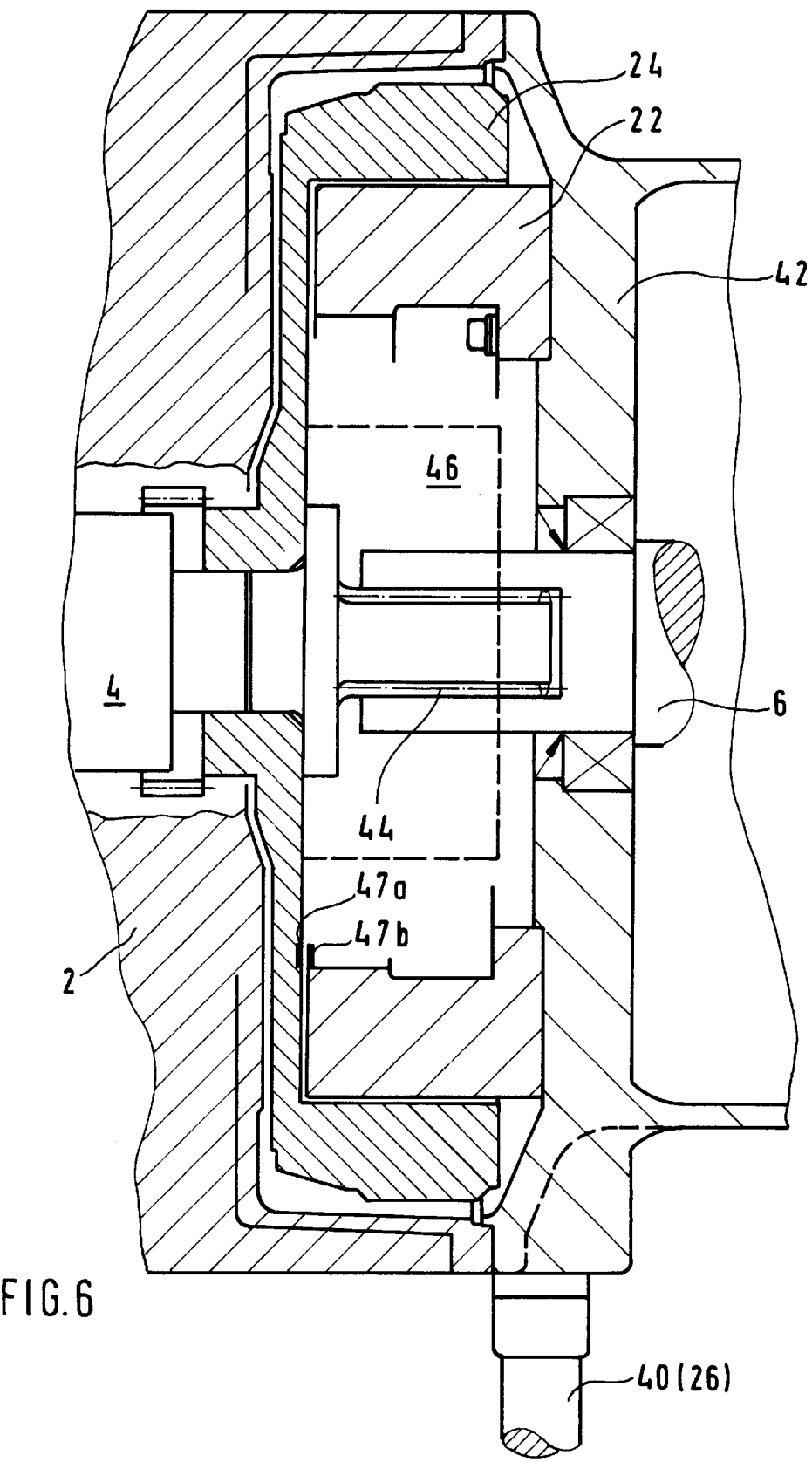
FIG. 6 shows a longitudinal sectional view through a practical embodiment of an electric generator disposed in the flywheel housing of a combustion engine.

FIG. 6 shows a longitudinal sectional view through an electric generator 10 disposed between combustion engine 2 and transmission 8 in a specific construction. Transmission 8 ends with a transmission cover 42 whose peripheral flange in conventional vehicles is threadedly attached to the matching standard flange of the engine block, but which according to FIG. 6 is attached to the outside flange of the generator housing, the outside flange being in turn connected to the corresponding flange of the flywheel housing of combustion engine 2.

Via a connecting piece 40, the electric connecting cables 26 shown schematically in FIG. 2 are fed to the engine. Connecting piece 40 contains furthermore coolant tubes. Both the coolant tubes and the connecting cables, which are not shown specifically in FIG. 6, are guided in integrated channels within transmission cover 42. The input shaft of the transmission is coupled with crankshaft 4 via a plug-type tooth means. A flexible coupling 46 can be disposed between generator and transmission 8.

A high-resolution position indicator system 47*a*, 47*b* is used to detect the position of rotor 24 relative to stator 22 in the course of rotation. This can be realized for example by superimposing two alternating field signals which are evaluated in a suitable electronics unit. The rotor speed can be calculated from the change in the rotor position signal, and deviations of the momentary rotor speed from the average value or between actual value and desired value can be detected by averaging or by comparison of actual speed value and desired speed value. The reaction of the generator and the power electronics unit consists in applying positive or negative additional forces during rotation which counteract the negative or positive speed deviations, respectively, or, in other words, the forces causing these deviations.

What is claimed is:

1. An electrical generator system for a motor vehicle, comprising:

(a) a combustion engine having a shaft;

(b) a mechanical drive train coupled with the shaft;

(c) an electric generator having a rotor, a stator, and an electrical output, disposed with its rotor coaxial to the shaft of the combustion engine and positioned between the engine and the input of the drive train, and driven directly by the shaft; and (d) a power electronics unit having an input connected to the electrical output of the generator, wherein (e) the power electronics unit is connected to the combustion engine and is responsive to a change in the electrical output of the generator to control the combustion engine to perform a corresponding change in the engine mechanical power output, and (f) the power electronics unit further includes a direct-voltage intermediate circuit having a voltage of at least 100 V, the direct-voltage intermediate circuit supplying power to at least one of (1) electrical loads connected directly to the direct-voltage intermediate circuit and (2) electrical assemblies that produce different voltages for electrical loads .

2. The system of claim 1, wherein the rotor and the stator of the generator are disposed spatially between the combustion engine and the transmission.

3. The system of claim 1, wherein the generator comprises outside rotor construction with the rotor outside and the stator inside.

4. The system of claim 1, wherein the generator comprises inside rotor construction with the rotor inside and the stator outside.

5. The system of claim 1, wherein the rotor includes permnanent-magnetic excitation.

6. The system of claim 1, wherein the rotor and stator of generator each comprise thin-walled cylinders and a part of the mechanical drive line is received for coupling with the shaft in the space located radially inside with respect to the stator and the rotor.

7. The system of claim 1, wherein the generator has a mounting diameter and an axial mounting length, and the ratio of mounting diameter to axial mounting length is $\geq 2$.

8. The system of claim 1, wherein the rotor of the generator comprises a flywheel of the combustion engine.

9. The system of claim 1, wherein the rotor of the generator includes external teeth means meshing with a starter pinion.

10. The system of claim 1, wherein the housing of the generator includes mounting flanges corresponding to the standard dimensions of flanges of combustion engines.

11. The system of claim 1, wherein the direct-voltage intermediate circuit delivers a direct voltage between 100 and 1000 V.

12. The system of claim 1, wherein the output of the power electronics unit produces voltages and frequencies for the loads directly on the output side.

13. The system of claim 1, wherein the power electronics unit further includes an electric/electronic power control for selectively controlling the loads connected.

14. The system of claim 1, further including a separate power control for individual loads or load groups.

15. The system of claim 1, wherein the electric generator supplies power to at least one of a board wiring system of the vehicle and additional external electric equipment.

16. The system of claim 1, wherein the generator is operable as a motor and serves as one of a starter for the combustion engine and a support for a separate starter motor.

17. The system of claim 1, wherein the power electronics unit has a generator mode to perform power electronics commutation and a motor mode to control the generator when operated as a motor.

18. The system of claim 1, wherein the power electronics unit further includes an electronic assembly for a motor mode of operation of the generator.

19. An electrical generator system for a motor vehicle comprising:

(a) a combustion engine having a shaft;

(b) a mechanical drive train coupled with the shaft;

(c) an electric generator having a rotor, a stator, and a electrical output, disposed with its rotor coaxial to the shaft of the combustion engine between the engine and the input of the drive train, and driven directly by the shaft; and (d) a power electronics unit having an input connected to the electrical output of the generator, wherein (e) the power electronics unit is connected to the combustion engine and is responsive to a change in the electrical output of the generator to control the combustion enegine to perform a corresponding change in the engine mechanical power output, and (f) the power electronics unit further includes outputs for directly supplying at least one of (1) different voltages and (2) different frequencies for electrical loads.

20. The system of claim 19, wherein the generator comprises outside rotor construction with the rotor outside and the stator inside.

21. The system of claim 19, wherein the generator comprises inside rotor construction with the rotor inside and the stator outside.

22. The system of claim 19, wherein the rotor includes permanent-magnetic excitation.

23. The system of claim 19, wherein the rotor and stator of the generator each comprise thin-walled cylinders and a part of the mechanical drive line is received for coupling with the shaft in the place located radially inside with respect to the stator and the rotor .

24. The system of claim 19, wherein the generator has a mounting diameter and an axial mounting length, and the ratio of mounting diameter to axial mounting length is $\geq 2$.

25. The system of claim 19, wherein the rotor of the generator comprises a flywheel of the combustion engine.

26. The system of claim 19, wherein the rotr of the generator includes external teeth means meshing with a starter pinion.

27. The system of claim 19, wherein the housing of the generator includes mounting flanges corresponding to the standard dimensions of flanges of combustion engines.

28. The system of claim 19, wherein the power electronics unit further includes a direct-voltage intermediate circuit delivering a direct voltage between 100 and 1000 V.

29. The system of claim 28, wherein the direct-current intermediate circuit has at least one of electronic loads directly connected directly to the circuit and electronic assemblies connected to the circuit for converting voltage of different voltages.

30. The system of claim 19, wherein the power electronics unit further includes an electric/electronic power control for selectivelycontrolling the loads connected.

31. The system of claim 19, further including a separate power control for individual loads or load groups.

32. The system of claim 19, wherein the electric generator supplies power to at least one of a board wiring system of the vehicle and additional external electric equipment.

33. The system of claim 19, wherein the generator is operable as a motor and serves as one of a starter for the combustion engine and a support for a separate starter motor.

34. The system of claim 19, wherein the power electronics unit has a generator mode to perform power electronics commutation and a motor mode to control the generator when operated as a motor.

35. The system of claim 19, wherein the power electronics unit further includes an electronic assembly for a motor mode of operation of the generator.

36. The system of claim 19, wherein the rotor and the stator of the generator are disposed spatially between the combustion engine and the transmission.

* * * * *